(12) United States Patent
León-Guarena et al.

(10) Patent No.: US 10,404,049 B2
(45) Date of Patent: Sep. 3, 2019

(54) RIGID JOINT ASSEMBLY

(71) Applicant: NKT HV Cables GmbH, Baden (CH)

(72) Inventors: Armando León-Guarena, Malmö (SE);
Andreas Tyrberg, Lyckeby (SE);
Henrik Ekholm, Listerby (SE)

(73) Assignee: NKT HV Cables GmbH, Baden (CH)

( * ) Notice: Subject to any disclaimer, the term of this patent is extended or adjusted under 35 U.S.C. 154(b) by 0 days.

(21) Appl. No.: 15/574,620

(22) PCT Filed: Jun. 2, 2015

(86) PCT No.: PCT/EP2015/062262
§ 371 (c)(1),
(2) Date: Nov. 16, 2017

(87) PCT Pub. No.: WO2016/192778
PCT Pub. Date: Dec. 8, 2016

(65) Prior Publication Data
US 2018/0138686 A1    May 17, 2018

(51) Int. Cl.
*H02G 15/10* (2006.01)
*H02G 15/103* (2006.01)
(Continued)

(52) U.S. Cl.
CPC ............ *H02G 15/10* (2013.01); *H01B 7/14* (2013.01); *H02G 3/0481* (2013.01); *H02G 15/103* (2013.01); *H02G 15/14* (2013.01)

(58) Field of Classification Search
CPC ...... H02G 15/103; H02G 15/14; H02G 15/20; H02G 15/24
See application file for complete search history.

(56) References Cited

U.S. PATENT DOCUMENTS

| 2,118,546 A | * | 5/1938 | Beaver | H02G 15/24 174/21 R |
| 2,142,884 A | * | 1/1939 | Chaplin | H02G 15/24 174/106 R |

(Continued)

FOREIGN PATENT DOCUMENTS

| CL | 2017003041 A1 | 4/2018 |
| DE | 691078 C | 5/1940 |

(Continued)

OTHER PUBLICATIONS

International Preliminary Report on Patentability Application No. PCT/EP2015/06226 Completed Date: Sep. 12, 2017 8 pages.

(Continued)

*Primary Examiner* — Timothy J Thompson
*Assistant Examiner* — Rhadames Alonzo Miller
(74) *Attorney, Agent, or Firm* — Whitmyer IP Group LLC

(57) ABSTRACT

A rigid joint assembly including a first and second cable core end sections of a first and second electric cables, including cores having a conductor, and an insulation system having a semi-conducting layer, an insulation layer and a semi-conducting layer. The assembly includes a joint connection, and a water tight metal casing. The casing assembly has a first and second cable entry parts for receiving the first and second cable cores having joint assembly includes first and second deformation preventing members that surround cable core end sections and includes a rigid pipe.

19 Claims, 3 Drawing Sheets

(51) Int. Cl.
*H02G 15/14* (2006.01)
*H01B 7/14* (2006.01)
*H02G 3/04* (2006.01)

(56) References Cited

U.S. PATENT DOCUMENTS

| | | | | | |
|---|---|---|---|---|---|
| 2,169,570 | A | * | 8/1939 | Ronci | H02G 15/013 123/169 TC |
| 2,287,163 | A | * | 6/1942 | Bishop | H02G 15/14 156/49 |
| 2,908,744 | A | * | 10/1959 | Bollmeier | H02G 15/113 174/76 |
| 4,024,718 | A | * | 5/1977 | Roche | E21B 7/128 114/258 |
| 4,032,214 | A | * | 6/1977 | McNerney | H01R 13/523 29/870 |
| 4,518,632 | A | * | 5/1985 | Jones | D01F 11/127 174/128.2 |
| 4,785,139 | A | * | 11/1988 | Lynch | G02B 6/4465 138/121 |
| 5,125,061 | A | * | 6/1992 | Marlier | G02B 6/4416 174/70 R |
| 5,125,062 | A | * | 6/1992 | Marlier | G02B 6/4416 174/70 R |
| 5,278,358 | A | * | 1/1994 | Blondin | G02B 6/3887 174/70 R |
| 5,286,921 | A | * | 2/1994 | Fontaine | G01K 1/026 174/68.1 |
| 5,375,939 | A | * | 12/1994 | Brown | H02G 15/007 24/122.3 |
| 5,520,422 | A | * | 5/1996 | Friedrich | F16L 9/12 285/296.1 |
| 5,661,842 | A | * | 8/1997 | Faust | H01R 4/72 174/93 |
| 6,292,436 | B1 | * | 9/2001 | Rau | G01V 1/201 114/245 |
| 2002/0168231 | A1 | * | 11/2002 | Hayakawa | H02G 1/10 405/158 |
| 2004/0097131 | A1 | * | 5/2004 | Varreng | H01R 13/523 439/587 |
| 2004/0160663 | A1 | * | 8/2004 | DeVincentis | G02B 6/4428 359/333 |
| 2004/0196529 | A1 | * | 10/2004 | Young | G02B 6/4428 359/333 |
| 2005/0036751 | A1 | * | 2/2005 | Young | G02B 6/4428 385/100 |
| 2005/0105164 | A1 | * | 5/2005 | Young | G02B 6/4428 359/333 |
| 2005/0179988 | A1 | * | 8/2005 | Young | G02B 6/4428 359/333 |
| 2005/0185257 | A1 | * | 8/2005 | Young | G02B 6/4428 359/333 |
| 2005/0200943 | A1 | * | 9/2005 | DeVincentis | G02B 6/4427 359/333 |
| 2005/0201709 | A1 | * | 9/2005 | DeVincentis | G02B 6/4428 385/135 |
| 2005/0217882 | A1 | * | 10/2005 | Rizzuto, Jr. | F16L 25/10 174/480 |
| 2007/0053645 | A1 | * | 3/2007 | Kordahi | G02B 6/4428 385/135 |
| 2007/0269169 | A1 | * | 11/2007 | Stix | G02B 6/3816 385/100 |
| 2007/0289779 | A1 | * | 12/2007 | Howard | E21B 17/028 175/40 |
| 2009/0272561 | A1 | * | 11/2009 | Norde | H02G 15/115 174/135 |
| 2011/0107834 | A1 | * | 5/2011 | Howard | E21B 17/028 73/431 |
| 2011/0188803 | A1 | * | 8/2011 | Kordahi | G02B 6/4428 385/24 |
| 2013/0170519 | A1 | * | 7/2013 | Alliot | F16L 13/0272 374/161 |
| 2014/0166335 | A1 | * | 6/2014 | Kagoura | H01B 7/045 174/107 |
| 2014/0270674 | A1 | * | 9/2014 | Cairns | G02B 6/4441 385/135 |
| 2015/0234143 | A1 | * | 8/2015 | Smith | G02B 6/4494 702/2 |
| 2016/0054535 | A1 | * | 2/2016 | Toth | G02B 6/4428 385/135 |

FOREIGN PATENT DOCUMENTS

| | | |
|---|---|---|
| EP | 0744806 A1 | 11/1996 |
| EP | 2026439 A1 | 2/2009 |
| EP | 2113978 A1 | 11/2009 |
| GB | 356050 A | 9/1931 |
| JP | S5252096 U | 4/1977 |
| JP | 56149011 A | 11/1981 |
| JP | S57148513 A | 9/1982 |
| JP | H08327846 A | 12/1996 |
| JP | 2007325443 A | 12/2007 |

OTHER PUBLICATIONS

International Search Report & Written Opinion of the International Searching Authority Application No. PCT/EP2015/062262 Completed Date: Oct. 1, 2015; dated Oct. 13, 2015 10 pages.
Written Opinion of the International Preliminary Examining Authority Application No. PCT/EP2015/062262 dated Apr. 21, 2017 6 pages.
Chile Office Action & Translation Application No. 201703038 dated Nov. 14, 2018 18 pages.
Japanese Office Action and Translation Application No. 2017-562682 Completed Date: May 22, 2019; dated May 28, 2019 6 Pages.

* cited by examiner

RIGID JOINT ASSEMBLY

TECHNICAL FIELD

The disclosure relates to a rigid joint assembly for electric cables, and primarily medium or high voltage submarine cables.

BACKGROUND

High voltage (HV) and medium voltage (MV) cables are used for power distribution on land and in the sea. Such cables often uses an extruded insulation system and comprise an electric conductor that is surrounded by an insulation system and a number of layers of different materials having different purposes and uses, e.g. as many as eight to nine layers. The insulation system comprises an inner semi-conducting layer closest to the conductor, an insulation layer externally of the conductor screen and an outer semi-conducting layer.

It is common to use the term cable core, and generally the cable core comprises the main layers of an inner electric conductor, and the insulation system as described above and comprising at least an inner semi-conducting layer, an insulation layer and an outer semi-conducting layer. The term cable core usually also includes, externally of the insulation and from inside out, any optional swelling material, if used, a metal sheath and an extruded oversheath that may be semi-conducting or insulating.

A pre-fabricated joint can be used when jointing two lengths of cable. The pre-fabricated joint comprises a pre-moulded/pre-fabricated joint body of e.g. rubber that is used to restore the insulation system when jointing the two lengths of cable. The conductors of the cable cores are jointed and the insulation systems of the jointed cable cores are restored in the joint body. This type of joint is commonly used for jointing high voltage cables with an extruded insulation system, normally comprising cross linked polyethylene (XLPE). For submarine cables, the pre-fabricated joint body is mounted in air at atmospheric pressure and then placed inside a water tight metal casing. The metal sheath of the cable core is normally connected to the casing through soldering, thereby achieving an overall watertight design for the joint.

For submarine DC cables containing one cable core, a rigid joint consists of one of these metallic casings containing a cable core joint, which casing normally is placed in an outer container that is also used to connect the armour layers of the cable. For submarine AC cables containing three cable cores, a rigid joint consists of three of these metallic casings, each containing a core joint, which casing are normally placed in an outer container which is also used to connect the armour layers of the cables. The entire joint including the outer container is commonly referred to as a rigid joint.

When such a rigid joint is used for jointing of submarine cables, the outer container that surrounds the water tight metal casing/casings has a mechanical function of protecting the casings and it is usually filled with water, when the cable and the rigid joint is submersed into the water. Thus, the inner water tight casing functions as a pressure vessel with an atmospheric pressure inside, and hydrostatic pressure of the water outside the casing. This results in a pressure gradient along the electrical core that is being jointed. The above described type of rigid joint with pre-fabricated rubber joint body has successfully been implemented for submarine cables at water depth up to approximately 600 m, corresponding to a hydrostatic pressure of approximately 6 MPa.

However, the question arises if such rigid joints could be used for large water depths, deeper than 600 m.

It has been found that for large water depths the scenario does not look well if a regular rigid joint is used. According to numerical analysis and experiments, an excessive deformation is expected over the extruded insulation in a critical transition region just outside the inner casing, where the cable core is entering into the inner casing. A significant reduction in the outer diameter of the cable core insulation occurs, so called necking, which is due to plastic deformation, yielding and/or creep of the cable insulation. Such deformations can significantly affect the optimal electrical characteristics of the extruded insulation, e.g. create undesirable consequences for the electrical field distribution over the cable and therefore cause its failure under operation.

The critical transition region, where the cable core is close to entering the inner casing of the joint, is severely affected by a significant pressure difference or gradient. Outside the casing, the cable core is exposed to a high hydrostatic pressure due to the large water depth, while inside the casing the cable core is under atmospheric pressure. During operation, the insulation system will be heated which reduces the mechanical strength of the extruded insulation, making the insulation even more susceptible to deformation.

Also, over this critical transition region, the high pressure difference creates a significant unbalanced compressive stress state on the cable along its axial direction. Thus, at the same time as the excessive necking occurs, there is a tendency for the extruded insulation to be displaced along the axial direction of the cable core towards the interior of the casing, where the pressure is lower. In addition to negatively affecting the electrical properties, this could also affect the water tightness of the casing at the location where the core enters the casing.

SUMMARY

An object of the present invention is to provide an improved rigid joint assembly that is suitable to use for submarine cables at large water depth.

According to the present invention is defined a rigid joint assembly comprising a first cable core end section of a first electric cable, and a second cable core end section of a second electric cable, said respective first and second cable core end section comprising an electrical cable core comprising at least an inner electric conductor, and an insulation system comprising at least an inner semi-conducting layer, an insulation layer and an outer semi-conducting layer, said rigid joint assembly further comprising a joint connection inside which the electrical cable core of the first cable core end section of the first electric cable is jointed with the electrical cable core of the second cable core end section of the second electric cable, the rigid joint assembly further comprising a water tight metal casing assembly surrounding the joint connection, which casing assembly comprises a casing body, a first cable entry part comprising an opening for receiving the cable core of the first cable core end section of the first cable, and a second cable entry part comprising an opening for receiving the second cable core end section of the second cable, and wherein the casing assembly contains a compressible gas, characterized in that the rigid joint assembly further comprises a first cable insulation system deformation preventing member that surrounds the first cable core end section at the first cable entry part and a second cable insulation system deformation preventing member that surrounds the second cable core end section at the second cable entry part, and that the respective first and second cable insulation system deformation preventing member comprises a rigid pipe that surrounds the respective cable core end section at the respective cable entry part.

By providing a cable insulation system deformation preventing member comprising a rigid pipe that surrounds the cable core end section of the respective cable at the cable entry part of the casing assembly is obtained the advantage that the rigid joint assembly can be used for jointing of extruded submarine cables at large water depths, since the cable core end section in the vicinity of the cable entry part of the casing assembly, which cable core end section is subjected to the pressure difference between the gas pressure inside the casing assembly and a hydrostatic pressure externally of the casing assembly and comprises the critical transition region, will be protected by the rigid pipe. Consequently, the insulation system of the cable at the cable core end section will be protected from deformation such as necking, and the rigid pipe will also act to prevent that the insulation is displaced in the axial direction, from the side with hydrostatic pressure into the casing assembly with lower pressure, where the rigid pipe surrounds the cable core end section, since the rigid pipe will act to contain the cable core end section with the insulation system inside the pipe. If there is no place where to the material can be displaced nor allowed to expand, there cannot be any necking.

According to one feature, the rigid pipe may at least partly extend inside the cable entry part of the casing assembly. This will help to prevent that the insulation system is deformed and/or displaced in the cable entry part of the casing assembly. However, it should be noted that generally it is conceivable that the rigid pipe may be located totally outside cable entry part of the casing assembly, totally inside the cable entry part of the casing assembly or partly outside and partly inside the cable entry part of the casing assembly. Though, the rigid pipe should preferably be located such that there is no part of the cable insulation system that is directly exposed to external pressure between the rigid pipe and the cable entry part of the casing assembly.

According to another feature, the rigid pipe may have a cylindrical internal surface that is in continuous contact with an external surface of the cable core end section which it surrounds. Having continuous contact over some length will also contribute to prevent that the insulation system, or parts thereof, is deformed and/or displaced in the cable entry part of the casing assembly. The cylindrical internal surface may have an axial length of at least 50 mm, preferably at least 100 mm, or even at least 150 mm.

According to a further feature, the rigid pipe of the respective cable insulation system deformation preventing member may be in direct contact with the respective cable core end section. The direct contact will also contribute to preventing deformation and/or displacement of the insulation system.

According to yet another feature, the rigid pipe of the respective cable insulation system deformation preventing member may be secured onto the respective cable core end section such that axial movement of the insulation system in relation to the rigid pipe is prevented. By effectively securing the rigid pipe to the cable core end section is obtained a more effective prevention of deformation and/or displacement of the cable insulation system.

For example, the rigid pipe of the respective cable insulation system deformation preventing member may be pressed onto the respective cable core end section, thereby creating a contact pressure between the cable insulation system and the rigid pipe. This will be very efficient to prevent deformation and/or displacement of the cable insulation system or parts thereof. The word pressed includes e.g. clamping and e.g. crimping by means of a crimping tool.

According to one variant, the rigid pipe of the respective cable insulation system deformation preventing member may be secured directly onto the outer semi-conducting layer of the insulation system of the cable core of the respective cable core end section.

According to another variant, wherein the cable core of the respective cable core end section further comprises an outer metal sheath, externally of the cable insulation system, the rigid pipe of the respective cable insulation system deformation preventing member may be secured onto the outer metal sheath of the cable core of the respective cable core end section.

According to yet another variant, wherein the cable core of the respective cable core end section further comprises a bedding material externally of the cable insulation system, the rigid pipe of the respective cable insulation system deformation preventing member may be secured onto the bedding material of the cable core of the respective cable core end section.

According to yet another variant, wherein the cable core of the respective cable core end section further comprises an outer metal sheath, externally of the cable insulation system, and a protective oversheath externally of the outer metal sheath, the rigid pipe of the respective cable insulation system deformation preventing member may be secured onto the protective oversheath of the cable core of the respective cable core end section. Such an oversheath may for example be of extruded polymer, it may be of an insulating material or it may be of a semi-conducting material.

According to a further feature, the rigid joint assembly may comprise, at each cable core end section, a securing arrangement axially locking the rigid pipe of the cable insulation system deformation preventing member in relation to the casing assembly. By also locking the rigid pipe in relation to the casing assembly, and thereby locking the cable core end section to the casing assembly, an even more effective way is obtained to prevent deformation and/or displacement of the cable insulation system or parts thereof.

According to yet another feature, the respective cable entry part may be a separate part connected to the casing body. This will facilitate the mounting of the different parts of the rigid joint assembly.

The joint connection mentioned is primarily, but not limited to, the type of pre-fabricated joint known in prior art as described above and comprising a pre-moulded/pre-fabricated joint rubber body that is used to joint two lengths of cable. The type of cable is primarily, but not limited to, a submarine cable having a cable core comprising an inner conductor and an extruded insulation system as described above. The cable core may also comprise further layers such as a metal sheath, a bedding layer, outer protective layer of e.g. polymer, as indicated in the dependent claims. The cable may also comprise a tensile armour layer, of e.g. metal wires, or other load carrying members. When laid down in water, one or more rigid joint assemblies according to the invention would usually be placed in an outer container which may also be used to connect the armour layers of the cables, as previously described.

Further features and advantages of the invention will also become apparent from the following detailed description of embodiments.

BRIEF DESCRIPTION OF THE DRAWINGS

The invention will now be described in more detail, with reference being made to the enclosed schematic drawings illustrating different aspects and embodiments of the invention, given as examples only, and in which.

Elements that are the same or represent corresponding or equivalent elements have been given the same reference numbers in the different figures.

DETAILED DESCRIPTION

Figure 1:
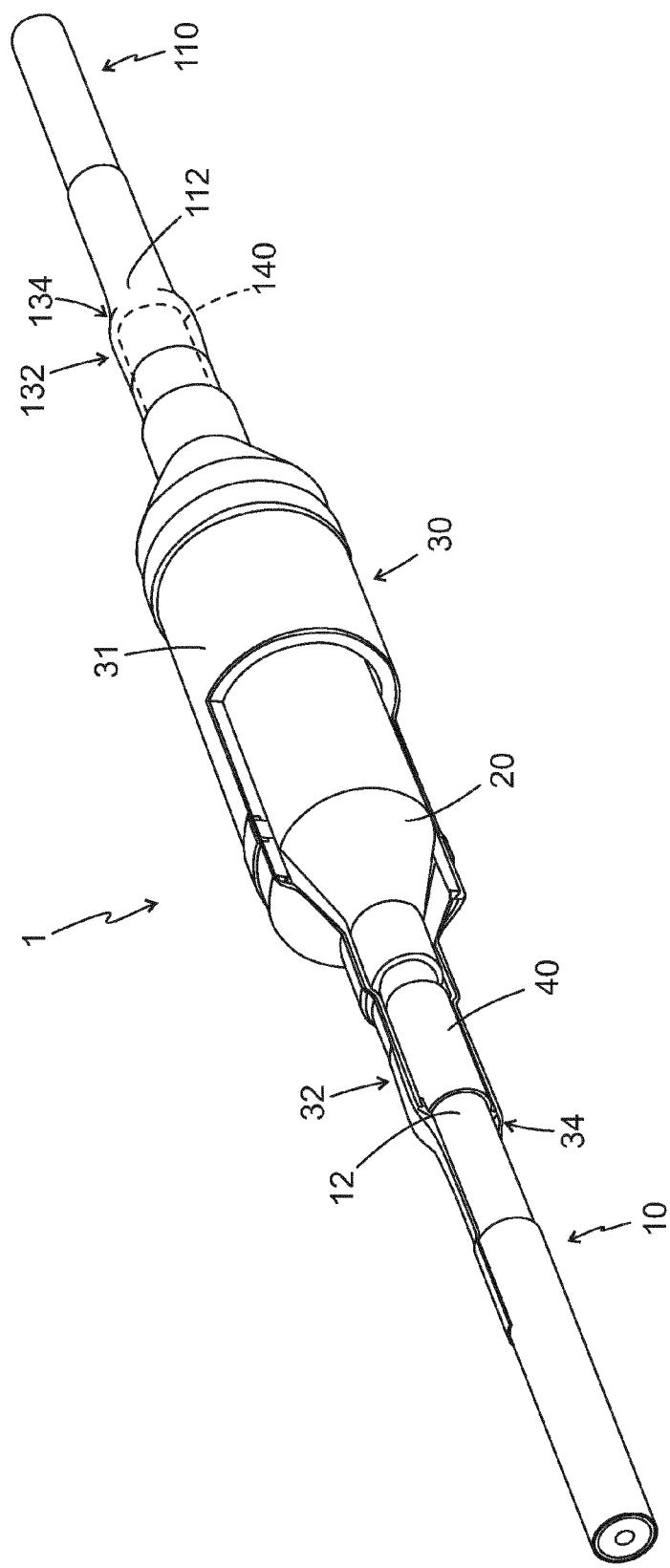
FIG. 1 illustrates schematically an embodiment of a rigid joint assembly according to the present invention, in a perspective view.

In FIG. 1 is illustrated a rigid joint assembly 1 comprising a joint connection 20 inside which the core end of a first electric cable 10 and the core end of a second electric cable 110 are connected. The cables are medium or high voltage cables suitable for submarine installation. The joint connection is e.g. a pre-fabricated joint of the type described above, comprising a pre-moulded/pre-fabricated rubber joint body that is used to restore the insulation system where the two core ends are jointed. The joint connection 20 is located in the hollow interior 36 of a water-tight metal casing assembly 30, see FIG. 2. The casing assembly 30 comprises a casing body 31, and a first cable entry part 32 having an opening 34 through which a cable core end section 12 of the first cable 10 enters into the casing assembly. This cable core end section 12 of the first cable will be referred to as the first cable core end section. The casing assembly 30 further comprises, at the end opposite the first cable entry part 32, a second cable entry part 132 having an opening 134 through which a cable core end section 112 of the second cable 110 enters into the casing assembly. This cable core end section 112 of the second cable will be referred to as the second cable core end section.

It should be understood that the casing assembly as such may comprise several components that originally are separate parts that are mounted together and connected, e.g. by welding or other means. For example, in order to be able to mount the casing assembly over the joint connection, the casing assembly would be divided in at least two casing assembly halves, such as a lower half and an upper half, that are assembled in order to obtain the casing assembly, usually welded together. When referring to the casing assembly, it should be understood that the word casing assembly means the entire casing assembly and includes all parts of the casing assembly, irrespective of if they are integral parts or components that have been assembled in order to form the casing assembly, unless otherwise explicitly stated.

When laying down the cables with the shown rigid joint assembly, one (if DC cable) or three (if AC cables) of these rigid joint assemblies are placed in an outer container (not shown) which is also used to connect the armour layers (not shown) of the cables. In the case of submarine cables, the outer container is filled with water that will consequently surround the casing assembly 30. However, inside the casing assembly there is still the same air pressure as when the casing assembly was installed around the joint connection on the installation or repair site, e.g. a vessel.

Figure 3:
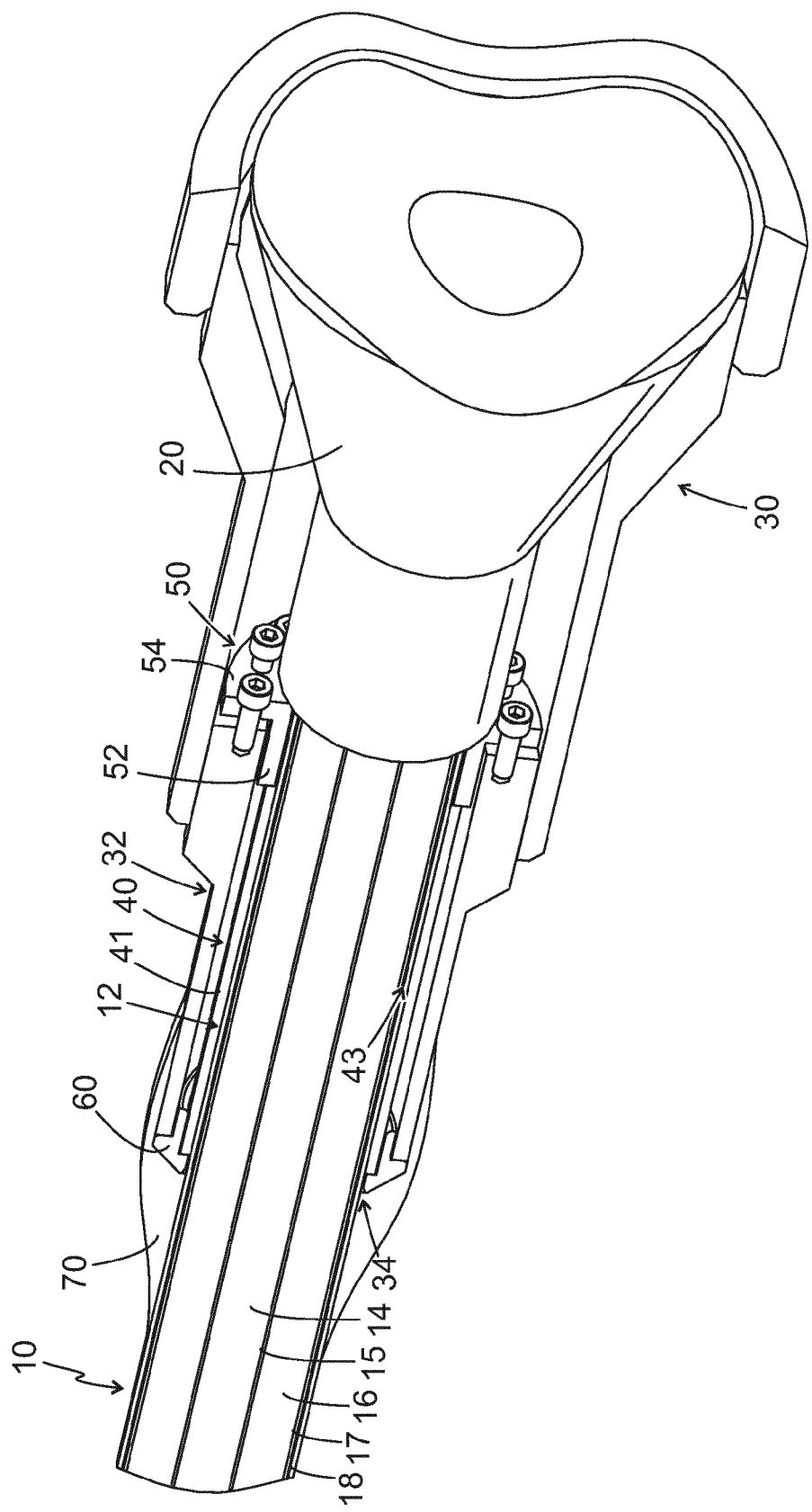
FIG. 3 is a schematical illustration of an embodiment of a rigid joint assembly, in cross section.

A schematic cross section of an example of a cable 10 is shown in FIG. 3, together with an embodiment of the rigid joint assembly according to the present invention. The concerned type of high voltage cable of extruded, e.g. XLPE, type will have many layers, but only the main layers of the cable core are shown in FIG. 3. In the illustrated example is shown an electric conductor 14 surrounded by an insulation system comprising an inner semi-conducting layer 15, an insulation layer 16 of e.g. XLPE, and an outer semi-conducting layer 17. Externally of the insulation system is a metal sheath 18, e.g. a lead sheath. These comprise the main layers of the cable core. The cable core may sometimes also comprise other internal layers, e.g. fillers or beddings, and it may comprise an extruded oversheath externally of the metal sheath. The cable will comprise other layers externally of the cable core, including tensile armour layer(s). However, these external layers have been removed at the cable core end section 12 of the cable 10 when preparing the cable for the joint. In the illustrated example, the cable core end section 12 of the cable 10 comprises only the mentioned main cable core layers.

In the interior 36 of the casing assembly there is a compressible gas, normally air at atmospheric pressure. However, the cable 10 outside of the casing assembly is subjected to the hydrostatic pressure from the water, as already explained, and this pressure is much higher than the pressure inside the casing assembly. This results in a pressure gradient that will affect the cable core end section 12 of the insulation in a pressure transition region in the vicinity of where the core enters the casing assembly. This transition region will extend outside of where the end section 12 of the core enters into the casing assembly 30 via the opening 34 and it will also extend for some length inside the cable entry part 32 of the casing assembly. As can be seen in the figures, the casing assembly 30 commonly has cone shaped end portions that are terminated by sleeve shaped parts that surrounds the cable core rather closely, where the cable core enters the casing assembly. In order to prevent deformation of the cable core, and in particular deformation of the cable core insulation layer 16 caused by the pressure gradient, a cable insulation system deformation preventing member 40 is arranged to surround the cable core end section 12 of the cable 10 at the first cable entry part 32, see FIGS. 2 and 3. A corresponding cable insulation system deformation preventing member 140 is also arranged to surround the cable core end section 112 of the second cable 110. In the illustrated embodiment, the cable insulation system deformation preventing member 40, 140 is in the shape of a protective rigid pipe 41 that surrounds the cable core end section 12, 112 of the cable 10, 12 at the respective first and second cable entry part 32, 132. The pipe is arranged concentrically with the cable core end section of the cable and should fit narrowly over the core to prevent that the cable insulation is displaced and redistributed axially along the cable core due to the pressure differences. If there is a high pressure on the cable core in one area, this may lead to deformation in that area by necking if the insulation material is allowed to be displaced from the necking area, along the axis of the cable, to another area with lower pressure where it can expand and a bulging of the insulation instead will occur. By having a tight fit of the pipe over the cable core, such deformation by displacement of the insulation material will be prevented, since there will not be any empty space inside the pipe that allows for any bulging of the insulation material. By creating a contact pressure between the pipe and the insulation, the resulting friction force will prevent axial displacement of the insulation system in relation to the pipe. Thus the pipe 41 should have a smooth interior surface that can fit snugly over the cable core end section 12 of the cable 10 and preferably also be in constant contact with the external surface of the cable core end section. In order to achieve this, the pipe will preferably have a cylindrical internal surface 43 that is in continuous contact with the external surface of the cable core end section which it surrounds. It is also preferred that the inner surface of the rigid pipe is in direct contact with the external surface of the cable core end section. The pipe preferably has a uniform wall thickness.

The rigid pipe 41 is secured onto the respective cable core end section 12; 112 such that axial movement of the insulation system 15, 16, 17 in relation to the rigid pipe is prevented, and this may e.g. be done by friction, as mentioned above.

Alternatively, the pipe 41 may be pressed onto the core of the cable core end section, e.g. by crimping, in order to have no gaps between the pipe and the core and to create a contact pressure between the pipe and the insulation system to also prevent axial displacement of the cable insulation material. The pipe is preferably made of metal, e.g. steel, that can sustain high external and internal pressures. E.g. the rigid pipe 41 can be made with an inner diameter that is slightly wider than the outer diameter of the cable core such that the rigid pipe can be axially slipped over the cable core end section 12, before jointing the two cable core ends. When the rigid pipe has been installed in its correct position over the cable core, a tool is used to secure the pipe onto the cable core, e.g. by pressing, in order to obtain the proper continuous contact between internal the surface 43 of the rigid pipe and the external surface of the cable core end section 12.

The cable core end section 12 and the cable insulation system deformation preventing member 40, i.e. the pipe 41, should also preferably be immovable in the axial direction in relation to the casing assembly 30. In FIG. 3 is illustrated a securing arrangement 50 for axially locking the cable insulation system deformation preventing member 40, i.e. the pipe 41 in this embodiment, in relation to the casing assembly 30. The securing arrangement comprises a short tube-shaped part 52 provided with a screw flange 54. The tube-shaped part 52 is concentric with the pipe 41 and abuts one end of the pipe, i.e. the end of the pipe that faces the interior of the casing assembly. The flange part 54 is perpendicular to the tube-shaped part and is provided with holes for screws by means of which it can be secured to the cable entry part 32 of the casing assembly. Since the inner end of the rigid pipe 41, i.e. the end that faces the interior of the casing assembly, abuts the tube-shaped part 52 of the securing arrangement that is secured by screws to the cable entry part 32 of the casing assembly 30, the rigid pipe cannot move axially in the direction towards the interior of the casing assembly. Generally, this direction is the only direction in which the pipe would move, due to the pressure gradient. As an alternative to the described securing arrangement using a screw flange, welding of the parts may be used.

The cable entry part 32 may be a component of the casing assembly that originally is a separate part in order to facilitate the mounting of the securing arrangement. After mounting of the securing arrangement, the respective cable entry part 32, 132 would then be connected to the casing body 31. Usually this is done by welding in order to obtain the water tight metallic seal that is required for the entire casing assembly. As another alternative, the cable entry part 32 may be an integral part of the casing assembly 30.

At the opposite end of the cable insulation system deformation preventing member 40, i.e. the pipe 41, there is an inlay 60 inserted between the pipe 41 and the surrounding wall of the casing assembly 30, i.e. the wall of the cable entry part 32. This inlay is designed to fill the gap between the cable core end section 12, the pipe 41 and the wall of the casing assembly 30. The inlay is annular or comprises two semi-annular parts, preferably of metal. This end region of the cable insulation system deformation preventing member 40, i.e. the end facing away from the interior of the casing assembly 30, is also covered by lead soldering 70 that ensures water tightness and a metallic fusion barrier. The solder covers the end of the cable entry part 32 of the casing assembly, the inlay 60, and extends onto the metal sheath of the cable core. Alternatively, if the cable insulation system deformation preventing member 40 extends further out from the casing assembly 30, the cable entry part 32 of the casing assembly may be soldered or welded directly onto the cable insulation system deformation preventing member 40. The cable insulation system deformation preventing member is connected to the metal sheath by soldering.

In the illustrated example, the outer layer of the cable core onto which the cable insulation system deformation preventing member 40 is mounted, has been described as being the metal sheath. However, it may also be possible to mount the cable insulation system deformation preventing member directly onto the outer semi-conducting layer of the insulation system. Alternatively, if the cable core end section comprises a bedding material externally of the cable insulation system, such as a layer of tape, the cable insulation system deformation preventing member may be secured onto the bedding material. It may also be possible to mount the cable insulation system deformation preventing member on a protective oversheath that is applied over the metal sheath. Irrespectively of what layer the cable insulation system deformation preventing member is mounted onto, the above described soldering that covers the end of the cable entry part 32 of the casing assembly and the inlay 60, or the variants described, is always made onto the metal sheath 18 of the cable core.

It should be understood that the exact axial location of the cable insulation system deformation preventing member 40, 140 in relation to the respective cable entry opening 34, 134 of the casing assembly 30 can be varied depending on circumstances on a case to case basis. Generally, the rigid pipe 41 of the cable insulation system deformation preventing member 40, 140 should preferably be located such that there is no part of the cable insulation system that is directly exposed to external pressure between the rigid pipe and the cable entry part of the casing assembly. Preferably, the rigid pipe should at least partly extend inside the cable entry part of the casing assembly, as in the illustrated example. The length of the rigid pipe 41 may vary depending on the particular circumstances in each case. A length of at least 50 mm is generally preferable, and more preferably at least 100 mm, or even at least 150 mm.

Figure 2:
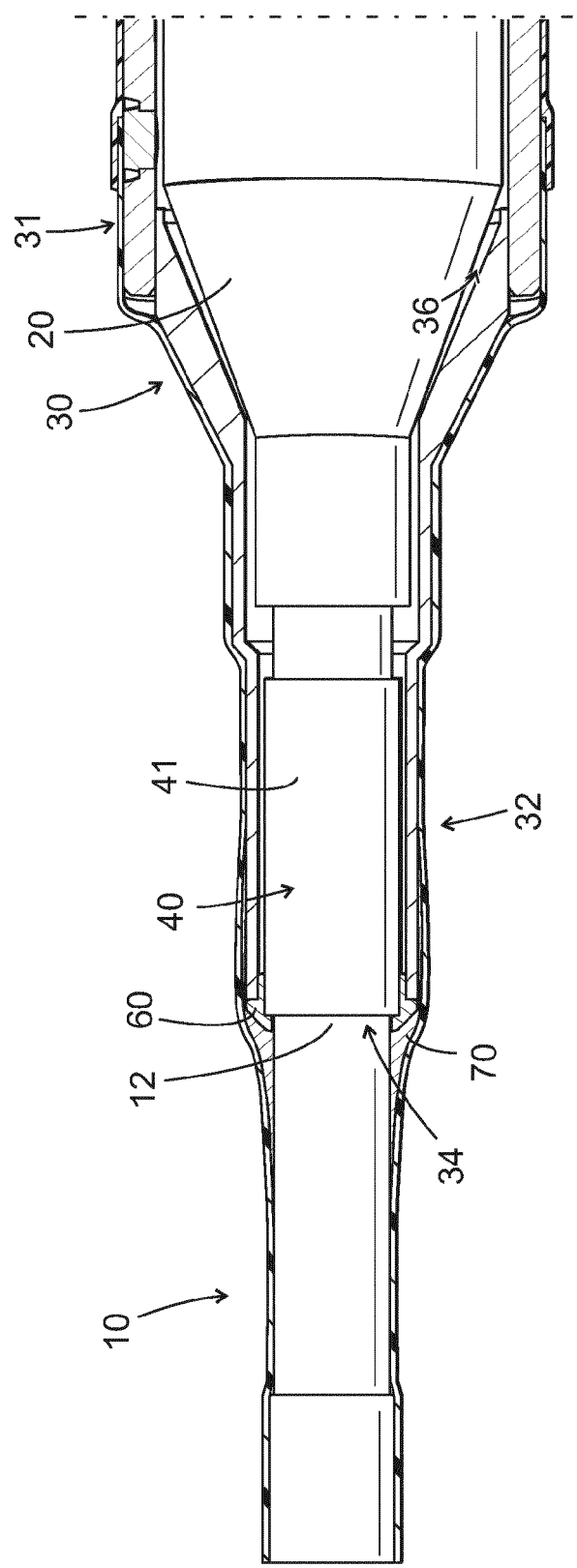
FIG. 2 is a more detailed schematical illustration of the rigid joint assembly of FIG. 1, partly in cross section.

In FIGS. 2 and 3 and the part of the description above that is related to these figures, the word cable has been used and the reference numbers related to the first cable in the joint of FIG. 1 have been used. However, it should be understood that everything that has been described relating to "the cable" and using the reference numbers of the first cable are equally applicable to the second cable 110 shown in FIG. 1.

In order to obtain the final rigid joint, the described inventive rigid joint assembly is placed in an outer container (not shown) in the usual manner that has been described in the background part of this description. For submarine DC cables containing one cable core, one rigid joint assembly is placed in the outer container which is also used to connect the armour layers of the cable. For submarine AC cables containing three cable cores, three of the described inventive rigid joint assemblies are placed in one outer container which is also used to connect the armour layers of the cables.

The invention shall not be considered limited to the illustrated embodiments, but can be modified and altered in many ways, as realised by a person skilled in the art, without departing from the scope defined in the appended claims. In particular, the invention should not be limited to a certain type of cable, but should encompass any type of electric cable having one or more electric cable cores that falls within the scope of the appended claims.

The invention claimed is:

1. A rigid joint assembly comprising:
   a first cable core end section of a first electric power distribution cable, and a second cable core end section of a second electric power distribution cable,
   said first cable core end section and said second cable core end section each including an electrical cable core having at least an inner electric conductor and an insulation system, the insulation system having at least an inner semi-conducting layer, an insulation layer, and an outer semi-conducting layer,
   a joint connection inside which the electrical cable core of the first cable core end section of the first electric cable is jointed with the electrical cable core of the second cable core end section of the second electric cable,
   a water tight metal casing assembly surrounding the joint connection, said casing assembly includes a casing body, a first cable entry part having an opening for receiving the first cable core end section of the first cable and a second cable entry part having an opening for receiving the second cable core end section of the second cable, and wherein the casing assembly contains a compressible gas,
   a first cable insulation system deformation preventing member that surrounds the first cable core end section at the first cable entry part and a second cable insulation system deformation preventing member that surrounds the second cable core end section at the second cable entry part,
   wherein each of the first and second cable insulation system deformation preventing members includes a rigid pipe that surrounds the respective cable core end section at the respective cable entry part, wherein the rigid pipe has a uniform wall thickness and the rigid pipe has a cylindrical internal surface that is in continuous contact with an external surface of the respective cable core end section which the rigid pipe surrounds,
   wherein the cable core of each cable core end section further comprises an outer metal sheath, externally of the cable insulation system, and
   wherein the corresponding cable insulation system deformation preventing member at the corresponding cable entry part is electrically connected to the metal sheath of the cable core via lead soldering.

2. The rigid joint assembly according to claim 1, wherein the rigid pipe at least partly extends inside the cable entry part of the casing assembly.

3. The rigid joint assembly according to claim 1, wherein the cylindrical internal surface has an axial length of at least 50 mm.

4. The rigid joint assembly according to claim 1, wherein the rigid pipe of the respective cable insulation system deformation preventing member is in direct contact with the respective cable core end section.

5. The rigid joint assembly according to claim 1, wherein the rigid pipe of the respective cable insulation system deformation preventing member is secured onto the respective cable core end section such that axial movement of the insulation system in relation to the rigid pipe is prevented.

6. The rigid joint assembly according to claim 1, wherein the rigid pipe of the respective cable insulation system deformation preventing member is pressed onto the respective cable core end section, thereby creating a contact pressure between the cable insulation system and the rigid pipe.

7. The rigid joint assembly according to claim 5, wherein the rigid pipe of the respective cable insulation system deformation preventing member is secured directly onto the outer semi-conducting layer of the insulation system of the cable core of the respective cable core end section.

8. The rigid joint assembly according to claim 5, wherein the rigid pipe of the respective cable insulation system deformation preventing member is secured onto the outer metal sheath of the cable core of the respective cable core end section.

9. The rigid joint assembly according to claim 5, wherein the cable core of the respective cable core end section further includes a bedding material externally of the cable insulation system, and the rigid pipe of the respective cable insulation system deformation preventing member is secured onto the bedding material of the cable core of the respective cable core end section.

10. The rigid joint assembly according to claim 5, wherein the cable core of the respective cable core end section further includes a protective oversheath externally of the outer metal sheath, and the rigid pipe of the respective cable insulation system deformation preventing member is secured onto the protective oversheath of the cable core of the respective cable core end section.

11. The rigid joint assembly according to claim 1, wherein it includes, at each cable core end section, a securing arrangement axially locking the rigid pipe of the cable insulation system deformation preventing member in relation to the casing assembly.

12. The rigid joint assembly according to claim 1, wherein the respective cable entry part is a separate part connected to the casing body.

13. The rigid joint assembly according to claim 2, wherein the cylindrical internal surface has an axial length of at least 50 mm.

14. The rigid joint assembly according to claim 6, wherein the rigid pipe of the respective cable insulation system deformation preventing member is secured directly onto the outer semi-conducting layer of the insulation system of the cable core of the respective cable core end section.

15. The rigid joint assembly according to claim 6, wherein the rigid pipe of the respective cable insulation system deformation preventing member is secured onto the outer metal sheath of the cable core of the respective cable core end section.

16. The rigid joint assembly according to claim 6, wherein the cable core of the respective cable core end section further includes a bedding material externally of the cable insulation system, and the rigid pipe of the respective cable insulation system deformation preventing member is secured onto the bedding material of the cable core of the respective cable core end section.

17. The rigid joint assembly according to claim 6, wherein the cable core of the respective cable core end section further includes a protective oversheath externally of the outer metal sheath, and the rigid pipe of the respective cable insulation system deformation preventing member is secured onto the protective oversheath of the cable core of the respective cable core end section.

18. The rigid joint assembly according to claim 1, wherein the corresponding cable insulation system deformation preventing member at the corresponding cable entry part is covered by said lead soldering which extends onto the metal sheath of the cable core.

19. A rigid joint assembly comprising:
  a first cable core end section of a first electric power distribution cable, and a second cable core end section of a second electric power distribution cable,
  said first cable core end section and said second cable core end section each including an electrical cable core having at least an inner electric conductor and an insulation system, the insulation system having at least an inner semi-conducting layer, an insulation layer, and an outer semi-conducting layer,
  a joint connection inside which the electrical cable core of the first cable core end section of the first electric cable is jointed with the electrical cable core of the second cable core end section of the second electric cable,
  a water tight metal casing assembly surrounding the joint connection, said casing assembly includes a casing body, a first cable entry part having an opening for receiving the first cable core end section of the first cable and a second cable entry part having an opening for receiving the second cable core end section of the second cable, and wherein the casing assembly contains a compressible gas,
  a first cable insulation system deformation preventing member that surrounds the first cable core end section at the first cable entry part and a second cable insulation system deformation preventing member that surrounds the second cable core end section at the second cable entry part, the first and second cable insulation system deformation preventing members being surrounded by the first and second cable entry parts respectively, and
  wherein each of the first and second cable insulation system deformation preventing members includes a rigid pipe that surrounds the respective cable core end section at the respective cable entry part, wherein the rigid pipe has a uniform wall thickness and the rigid pipe has a cylindrical internal surface that is in continuous contact with an external surface of the respective cable core end section which the rigid pipe surrounds.

* * * * *